(12) United States Patent
Welt

(10) Patent No.: US 7,184,987 B2
(45) Date of Patent: Feb. 27, 2007

(54) INTERNET-BASED SYSTEM AND METHOD FOR FACILITATING COMMERCIAL TRANSACTIONS BETWEEN BUYERS AND VENDORS

(75) Inventor: Martin Welt, Morris Plains, NJ (US)

(73) Assignee: Alpha Omega Technology Inc., Cedar Knolls, NJ (US)

( * ) Notice: Subject to any disclaimer, the term of this patent is extended or adjusted under 35 U.S.C. 154(b) by 703 days.

(21) Appl. No.: 09/996,879

(22) Filed: Nov. 30, 2001

(65) Prior Publication Data

US 2003/0105722 A1 Jun. 5, 2003

(51) Int. Cl.
G06Q 40/00 (2006.01)

(52) U.S. Cl. .......................... 705/64; 705/35; 705/37; 705/7; 705/26

(58) Field of Classification Search .................. 705/35, 705/37, 7, 8, 26, 64
See application file for complete search history.

(56) References Cited

U.S. PATENT DOCUMENTS

| 5,870,717 A * | 2/1999 | Wiecha ........................ 705/26 |
| 6,115,690 A | 9/2000 | Wong |
| 6,606,603 B1 * | 8/2003 | Joseph et al. .................. 705/26 |
| 2001/0051905 A1 * | 12/2001 | Lucas ........................... 705/29 |
| 2002/0010638 A1 * | 1/2002 | Fischer ......................... 705/26 |
| 2002/0052806 A1 * | 5/2002 | Hodson et al. ................ 705/27 |
| 2002/0147622 A1 * | 10/2002 | Drolet et al. ................... 705/7 |

FOREIGN PATENT DOCUMENTS

JP 06176085 A * 6/1992

OTHER PUBLICATIONS

Eliason, "Online Business Computer Application", 1987, SRA, Inc. ISBN 0-574-18620-4. (total of 48 pages).*

(Continued)

*Primary Examiner*—Ella Colbert
*Assistant Examiner*—Harish T. Dass
(74) *Attorney, Agent, or Firm*—Morgan, Lewis & Bockius, LLP

(57) ABSTRACT

An Internet-based, business-to-business web site which aggregates product information from each of a plurality of vendors into a common display format. In response to receiving identification information from an Internet-enabled computing device used by a buyer, the web site displays a list of departments or product categories for which the buyer is authorized to make purchases. Upon receipt of the buyer's selection of a product category or department, the web site displays a list of vendors that have authorized products corresponding to the selected department or category. Upon receipt of the buyer's selection of a vendor, the web site displays that vendor's list of approved products corresponding to the selected department or category. The buyer may place an order for one or more approved products, whereupon the web site receives order parameters, such as the identity of the product and the quantity desired. The web site then forwards the order to the selected vendor for fulfillment, and optionally tracks shipment of the order from the vendor to the buyer. Pursuant to further embodiments, a mechanism is provided for electronically debiting a buyer's bank account in response to at least one of a buyer placing an order and a buyer receiving an order. This mechanism may also be adapted to electronically credit a vendor's bank account in response to at least one of a buyer placing an order from the vendor and the vendor shipping the order to the buyer. Pursuant to an additional embodiment, a mechanism is provided by which data pertaining to a plurality of buyer and/or vendor transactions may be acquired, aggregated, analyzed, and examined.

56 Claims, 12 Drawing Sheets

OTHER PUBLICATIONS

Modern Purchasing, "The Web advantage: Grand & Toy's powerful Internet-based solution [Advertising supplement]", Toronto: Jul./Aug. 2000. p. S1;Periodical; ISSN/ISBN: 0026833X; ProQuest document ID: 418300201; Document URL: http://proquest.umi.com/pq.*

TIG Brief, Sep./Oct. 2001 "New WEB site speeds computer buying", The Inspector General. Washington: Sep./Oct. 2001.vol. 53, Iss. 5; p. 21, 1 pgs, Periodical; ISSN/ISBN: 8750376X; ProQuest document ID: 81468498; Document URL: http://proquest.umi.com/pqdweb?d.*

MacManus, Susan A., "Why Businesses Are Reluctant to Sell to Governments", Public Administration Review. Washington: Jul./Aug. 1991.vol.51, Iss. 4; p. 328, 17 pgs, ProQuest document ID: 708752.*

Buyproduce Website http://www.buyproduce.com/content/default.asp (Nov. 2, 2001).

ChemConnect Website http://www.chemconnect.com (Nov. 2, 2001).

VerticalNet Inc. Website http://www.verticalnet (Nov. 2, 2001).

BizProLink Website http://www.produceb2b.com (Nov. 2, 2001).

Michael Garry, "Supervalu to Put Suppliers on Portal" (Apr. 5, 2004) *available at* www.supermarketnews.com.

PRNewswire, "The Schwan Food Company Selects ICG Commerce to Help Drive Procurement Cost Savings" *available at* http://biz.yahoo.com/prnews/040427/ctgu059_2.html, visited Apr. May 3, 2004.

Wegmans Data Synchronization, *available at* www.gmabrands.com/events2003/datasync/timmons.pdf.

WWRE, Worldwide Item Management (WIM) Brochure (2003) *available at* www.wwre.org.

WWRE, "WWRE Overview" (2000-2003) *available at* www.wwre.org.

GMA Press Release, "Consumer Products Manufacturers To Create Industry's First Business-to-Business Marketplace" (Mar. 16, 2000).

* cited by examiner

BUYERS TABLE 401

| BUYER IDENTIFIER 403 | COMPANY IDENTIFIER 405 | AUTHORIZED DEPARTMENT IDENTIFIERS 407 | BUYER LOCATION IDENTIFIER 409 | BUYER PRIVILEGE LEVEL FIELD 411 |
|---|---|---|---|---|
| 19743 | 863 | 10, 21, 47 | 39 | 4 |
| JOSEPH | 57 | PRODUCE, MEATS | 520 | HIGH |
| MMARKOV | ACME | DAIRY | CHERRY HILL | 2 |
| SLOAN39 | GIANT | PRO2, DA17 | MARLTON, NJ | MEDIUM |
| 232ABX | S-R376 | M27, GO1 | NJ03 | R4 |
| NBQ | KINGS | ALL | ALL | MASTER |
| 437NAN | T-JONES | FROZENFDS | SNJ | PRICE = ADDL_DEPT = 0 |

FIG. 4

COMPANIES TABLE
500

| COMPANY IDENTIFIER 501 | DEPARTMENTS IDENTIFIER 503 | PRODUCT IDENTIFIERS 505 |
|---|---|---|
| ACME | DAIRY | DANNON_VANILLA_YOGURT KRAFT_AMERICAN_CHEESE ALPINE_LACE_SWISS FLEISCHMANNS_EGG_BEATERS |
|  | PRODUCE | SALTONSEA_PINK_GRAPEFRUIT DOLE_BANANAS TECATE_JALAPENOS |
| 11734 | B101 CZ7 HCJB | MV86, MC95, MN103, CC1, CC7, CD9, CF116, 1190, 5975, 11495 |
| TJOES | FRO-12 | CHICKVLOO, KUNGPAO, THAIRICE, ENCHDBL |
|  | CAN-01 | CHOCSHELLS, COVJELLY, BELGCHOC, TRUFF4 |

FIG. 5

INTERNET-BASED SYSTEM AND METHOD FOR FACILITATING COMMERCIAL TRANSACTIONS BETWEEN BUYERS AND VENDORS

BACKGROUND OF THE INVENTION

1. Field of the Invention

The present invention relates generally to computerized systems and methods for facilitating commerce and, more particularly, to Internet-based systems and methods for implementing transactions between a multiplicity of buyers and vendors.

2. Description of the Related Technology

The Internet has greatly facilitated the ease with which parties are able to implement commercial transactions. Instead of meeting face-to-face, corporate buyers can visit the web sites of various vendors to compare prices, delivery dates, availability, product specifications, and other terms. For example, consider the operational environment of a typical grocery store chain. The chain employs a staff of buyers, each of whom is responsible for maintaining stock in one or more departments of the store. Produce buyers ensure that sufficient stock of lettuce, tomatoes, bananas, and apples are on hand to meet anticipated demand. It is the job of dairy buyers to replenish stocks of milk, eggs, cheese, and yogurt. Each store in a chain may employ its own team of dairy, produce, meat, and other buyers, or, alternatively, some of these buyers may be responsible for restocking several stores in the chain. Pursuant to state-of-the-art computing technology, buyers may use Internet-enabled computing devices to log onto the websites of vendors offering products approved by the grocery store chain. Each vendor has a separate website with its own attendant graphical interfaces, navigational schemes, logon procedures, and presentation of information. Buyers must familiarize themselves with an often bewildering array of layouts, web page sequences, and ordering procedures. It is often difficult or time-consuming to locate needed information. These factors render the Internet unnecessarily cumbersome for implementing buyer-vendor transactions.

Due to the proliferation of individual vendor web sites, buyers are called upon to memorize and track vast amounts of information. The requirements governing logon IDs and passwords may differ from site to site. Buyers need to memorize each of these IDs and passwords, and then endure a tedious log-on procedure every time a new vendor web site is accessed. If a given vendor does not have a sufficient quantity of product on hand, the buyer can purchase from two or more different vendors, but the task of keeping track of these different orders falls to the buyer. As an additional consideration, a grocery store chain may approve some, but not all, products offered by a particular vendor. Vendor websites are not always equipped to provide such information to a buyer, with the result that a buyer could place an order for an unapproved product.

Illustrative period-art vendor websites have been developed by the Kirkey Products Group of Longwood, Fla. These systems are designed for use by one specific vendor such as a grower, packer, shipper, sales organization, and/or broker. Such systems provide sales management, packinghouse management, gift fruit shipping, caretaking/farm management, general ledger, accounts payable, and payroll functions for that vendor, based upon the specific requirements of that vendor's business operation. Kirkey's system are geared to handle a specific vendor's own unique way of doing business, as stated on the Products/Services web page, and are not intended to provide uniformity from vendor to vendor. Accordingly, they tend to exacerbate the problems as described above, whereby buyers must learn to deal with a multiplicity of unique vendor websites, each with its own peculiar operational characteristics, ordering sequences, and logon procedures.

Another illustrative prior art system presents users with access to one of a plurality of industry-specific web pages based upon selection of a predetermined business category from an online menu. One of these industry-specific web pages pertains to produce, and another to dairy products. These web pages do not bring together individual vendors and buyers, but rather function as an industry-specific online trade journal or newsletter. For example, the produce page contains produce-related news that is updated every 30 minutes. Several online calculation tools are provided to implement calculations related to the produce industry, and several online business forms are provided to assist in typical commercial transactions related to the purchase and sale of product. A list of upcoming trade shows and events is provided, and various produce-related stock prices are tracked. However, this system does not implement commercial transactions between buyers and vendors. Yet another prior art Internet-based commerce system is a verticalnet system The verticalnet system reduces the procurement cost of a specific buyer organization by allowing individual buyers to make buying decisions governed by the organization's procurement rules. The system operates in the context of a specific buyer organization, and places limitations on the manner in which buyers can interact with already-existing vendor websites. The foregoing problems with respect to lack of uniformity among vendor websites are not addressed—the buyer must still deal with a multiplicity of widely divergent vendor websites. In essence, the verticalnet system functions as a "guard" or gatekeeper, preventing the buyer from performing a function that is not permitted under the organization's procurement rules. The remainder of the vendor-buyer interaction proceeds as usual, pursuant to conventional Internet-based systems.

Still another prior-art system for facilitating Internet commerce is a ChemConnect system ChemConnect is-an online marketplace which provides commercial buyers with access to thousands of products. Some of these products are auctioned off in a virtual "corporate trading room". A virtual "commodities floor" provides a secure trading area for the buying and selling of standard, high-volume commodity chemicals and plastics. Another feature, termed "Envera", automates the actual order fulfillment, logistics, monitoring and tracking process. However, Envera is not integrated with ChemConnect's online marketplace features.

The ChemConnect system does not deal with issues that are inherent in many vendor-buyer transactions. For example, the ChemConnect system treats all registered buyers identically—any buyer can purchase any item, irrespective of whether the buyer's organization has authorized the buyer to purchase that type of item, and irrespective of whether a particular vendor's item is approved by that buyer's organization. Moreover, since ChemConnect presents all items to all buyers, a buyer may have to wade through extensive lists of items and categories that are not of interest in order to locate a needed item. Finally, the ChemConnect system does not provide a fully-integrated approach. The site does not list substantially all products of a given category that are offered by a particular vendor, nor does it provide a mechanism by which a buyer can shop exclusively with a first vendor, and then move on to shop exclusively with a second vendor. What is needed is an Internet-based system that is sufficiently flexible to meet the needs of various vendor-buyer relationships.

OBJECTS AND SUMMARY OF THE INVENTION

It is an object of the invention to provide an integrated Internet-based system for facilitating commerce between vendors and buyers.

It is a further object of the invention to provide a computerized system that permits commercial buyers to expeditiously order from any of a plurality of online vendors without the necessity of engaging in a plurality of tedious and time-consuming logon procedures.

It is yet another object of the invention to provide a computerized system that permits commercial buyers to order from a plurality of vendors using a single Internet portal.

It is still another object of the invention to provide an integrated Internet-based system that permits buyers to expeditiously order authorized products for one or more specific departments from one or more vendors.

It is still a further object of the invention to provide a computerized system that permits buyers to shop for approved products offered by a first vendor, followed by shopping for approved products offered by a second vendor.

It is yet a still further object of the invention to provide a fully integrated Internet-based system that provides ordering as well as shipment tracking capabilities from a single website.

It is another object of the invention to provide a mechanism for automatically placing an order for a buyer in response to the buyer's inventory dropping below a predetermined threshold.

It is yet another object of the invention to provide a mechanism for electronically debiting a buyer's bank account in response to at least one of a buyer placing an order and a buyer receiving an order.

It is a still further object of the invention to provide a mechanism for electronically crediting a vendor's bank account in response to at least one of a buyer placing an order from the vendor and the vendor shipping the order to the buyer.

It is still another object of the invention to provide a mechanism by which data pertaining to a plurality of buyer and/or vendor transactions may be acquired, aggregated, analyzed, and examined.

These and other objects of the invention are achieved in the form of an Internet-based, business-to-business web site which aggregates product information from each of a plurality of vendors into a common display format. In response to receiving identification information from an Internet-enabled computing device used by a buyer, the web site displays a list of departments or product categories for which the buyer is authorized to make purchases. Upon receipt of the buyer's selection of a product category or department, the web site displays a list of vendors that have authorized products corresponding to the selected department or category. Upon receipt of the buyer's selection of a vendor, the web site displays that vendor's list of approved products corresponding to the selected department or category. The buyer may place an order for one or more approved products, whereupon the web site receives order parameters, such as the identity of the product and the quantity desired. The web site then forwards the order to the selected vendor for fulfillment, and optionally tracks shipment of the order from the vendor to the buyer.

Pursuant to a further embodiment of the invention, each buyer is associated with a privilege level. A first privilege level only allows the buyer to view the identities and descriptions of approved vendor products. A second privilege level allows the buyer to view identities and descriptions as well as price information. A third privilege level allows buyers to view the orders and purchases of other buyers in the same product category or department. A fourth privilege level allows buyers to view all orders and purchases made by all buyers at a given location or facility. A fifth privilege level allows buyers to view all purchases made by all buyers at all facilities of a given buyer enterprise. A sixth privilege level, which may be termed "super-admin", provides a mechanism by which a super-administrator or the like can initiate the acquisition, aggregation, analyzing and/or examination of data pertaining to a plurality of buyer and/or vendor transactions.

Pursuant to a still further embodiment of the invention, every buyer order is assigned a unique order number that includes information identifying the year, month, day, and hour that the order was placed. Since more than one order may be placed during a particular year, month, day, and hour, the first incoming order during this time period is assigned a sequence number of 1, the second incoming order a sequence number of two, and so on. A status byte, assigned to each order, indicates whether the order is pending, cancelled, shipped full, shipped partial, back ordered, received full, received partial, refused full, or refused partial. The order status byte is updated in response to information received from vendors, buyers, and couriers such as UPS (United Parcel Service). Pursuant to a further embodiment of the invention, the fully-integrated Internet-based business-to-business web site initiates an electronic debiting of a buyer's bank account in response to at least one of a buyer placing an order and a buyer receiving an order. In accordance with a still further embodiment, the fully-integrated Internet-based business-to-business web site initiates an electronic crediting of a vendor's bank account in response to at least one of a buyer placing an order from the vendor and the vendor shipping the order to the buyer.

Pursuant to an additional embodiment of the invention, a fully integrated Internet-based system provides ordering as well as shipment tracking capabilities from a single business-to-business website. This website is programmed to automatically download information from a second website operated by or on behalf of a courier or shipping company such as UPS, FEDEX, RPS, Airborne Express, Navieras Shipping, Jevic Shipping, or the like. (Some or all of these names may be trademarked by third parties). The business-to-business website accesses the courier or shipping company website, periodically and/or in response to a request, to retrieve information about a specified buyer order.

Pursuant to yet another embodiment of the invention, a mechanism is provided for automatically placing an order for a buyer in response to the buyer's inventory dropping below a predetermined threshold. For each of a plurality of authorized vendor products, an electronic inventory control system at the buyer's store or chain of stores keeps track of retail customer sales. On a repeated or periodic basis, these sales figures are compared against inventory to determine stock on hand. If inventory or stock on hand drops below a predetermined threshold, a communications link is established between the electronic inventory control system and the business-to-business website, and a product identifier and buyer identifier are received at the website. In response to the receipt of a product identifier and a buyer identifier, the website automatically places an electronic order for the authorized product from a vendor.

Additional features and advantages of the invention will become more apparent from the following detailed description and accompanying drawings.

BRIEF DESCRIPTION OF THE DRAWINGS

FIG. 4 is a diagram setting forth an illustrative data structure for a Buyers Table to be utilized in conjunction with the operational sequence of FIGS. 3A–3F.

FIG. 5 is a diagram setting forth an illustrative data structure for a Companies Table to be utilized in conjunction with the operational sequence of FIGS. 3A–3F.

DETAILED DESCRIPTION OF THE PREFERRED EMBODIMENTS

Figure 1:
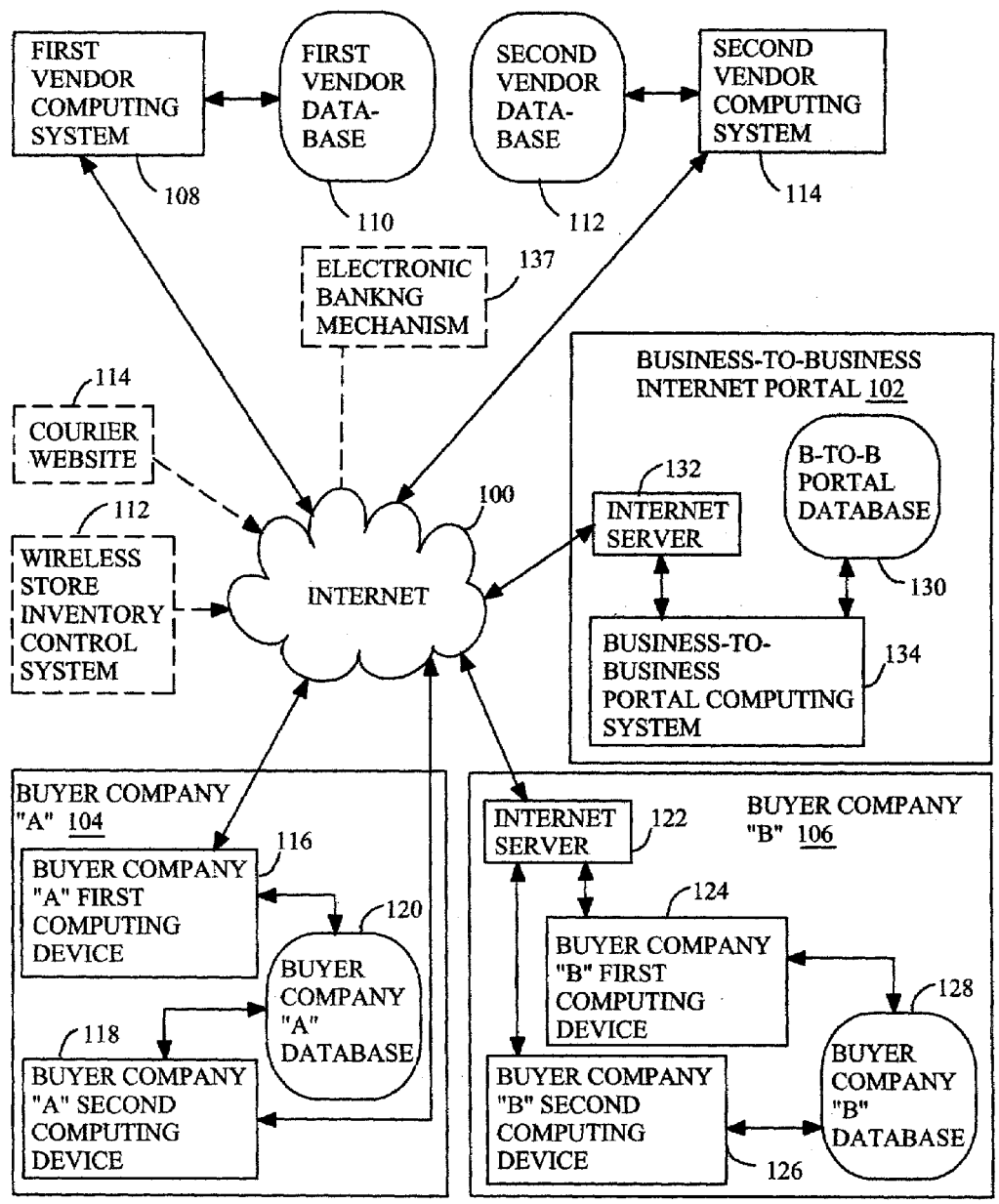
FIG. 1 is a hardware block diagram showing an illustrative operational environment for the present invention.

Refer to FIG. 1, which is a hardware block diagram showing an illustrative operational environment for the present invention. A first vendor computing system 108 and a second vendor computing system 114 are coupled to the Internet 100. First vendor computing system 108 is equipped with a first vendor database 110, and second computing system 114 is equipped with a second vendor database 112. These vendor computing systems 108, 114 may each be implemented using one or more personal computers, mainframe computers, laptop computers, networked computing devices, and/or various combinations thereof. First vendor database 110 and second vendor database 112 are each implemented using any computer-readable data storage medium, such as floppy disk drives, hard disk drives, optical data storage devices, semiconductor memory devices, magnetic data storage devices, and/or various combinations thereof. In the present context, the term "vendor" signifies an entity that sells products to "buyers" for eventual retail sale to end consumers. Illustrative vendors may include, for example, the Coca Cola Bottling Company, Sangean Electronics, Dane County Dairy Products, and Crane Bolts. Illustrative buyers purchase products from vendors for, or on behalf of, retail stores such as Acme, Giant, PathMark, CVS, ShopRite, Sears, Home Depot, Wal-Mart, and the like. (Some or all of these names may be trademarked by third parties).

A first buyer company, referred to hereinafter as "buyer company A" 104, is equipped with a first computing device 116 and a second computing device 118. First and second computing devices 116, 118 are each adapted for communications over the Internet 100, and may be implemented using laptop PC's, desktop personal computers, and/or other types of processing mechanisms. These computing devices 116, 118 communicate over the Internet using dial-up modems, networked TCP/IP connections, wireless modems, and/or any other type of Internet communications mechanism. First and second computing devices 116, 118 are each equipped to access a buyer company "A" database 120. This access may take place over a wired or wireless data communications link, a communications network, and/or by means of a removable or portable data storage medium.

A second buyer company, referred to hereinafter as "buyer company B" 106, is equipped with a first computing device 124 and a second computing device 126. First and second computing devices 124, 126 are each adapted for communications over the Internet 100, and may be implemented using laptop PC's, desktop personal computers, and/or other types of processing mechanisms. These computing devices 124, 126 communicate over the Internet using dial-up modems, networked TCP/IP connections, wireless modems, and/or any other type of Internet communications mechanism. First and second computing devices 124, 126 are each equipped to access a buyer company "B" database 128. This access may take place over a wired or wireless data communications link, a communications network, and/or by means of a removable or portable data storage medium. Buyer company "A" database 120 and buyer company "B" database 128 are each implemented using any computer-readable data storage medium, such as floppy disk drives, hard disk drives, optical data storage devices, semiconductor memory devices, magnetic data storage devices, and/or various combinations thereof.

An optional courier website 136 is coupled to the Internet 100. The purpose of courier website 136 is to provide buyers with shipment tracking information via a single business-to-business Internet portal 102. To this end, business-to-business portal transmits buyer and/or order and/or shipment and/or tracking number identification information to courier website 136, and courier website 136 downloads the corresponding tracking information to the business-to-business Internet portal 102. Business-to-business Internet portal 102 then reformats the display of tracking information and places this information into a fully integrated web site graphical interface for perusal by the buyer.

An optional wireless store inventory control system 138 is coupled to the Internet 100. Inventory control system 138 is utilized to implement the functionality of automatically placing buyer orders with a vendor in response to retail sales and/or depletion of stock. As retail consumers purchase goods at a store, inventory control system 138 tracks inventory levels for each of a plurality of authorized products. When the inventory level for a given authorized product drops below a predetermined threshold (as set, for example, by a buyer for the store, and/or as set by a business-to-business internet portal administrator), inventory control system 138 sends an authorized product depletion message over the Internet 100 to business-to-business Internet portal 102. This depletion message includes an identifier that uniquely identifies the depleted authorized product, along with the identity of the store and/or a buyer associated with, or operating on behalf of, the store, and an optional restocking parameter indicating a quantity of the depleted authorized product to be ordered. In response to receipt of the depletion message, business-to-business Internet portal 102 generates an electronic order for the authorized product and forwards the order to a vendor computing system of a vendor that sells the authorized product.

Optionally, the invention may provide a mechanism for electronically debiting a buyer's bank account in response to at least one of a buyer placing an order and a buyer receiving an order. The invention may also provide an optional mechanism for electronically crediting a vendor's bank account in response to at least one of a buyer placing an order from the vendor and the vendor shipping the order to the buyer. One or both of these optional features are provided in the form of an optional electronic banking mechanism 137 coupled to the Internet 100. The purpose of the electronic banking mechanism 137 is to facilitate and simplify buyer-vendor transactions. Buyers and vendors can implement virtually all phases of a transaction (except for the actual conveyance of ordered goods) via a single business-to-business Internet portal 102. All information necessary to complete a given transaction, including monetary and shipping data, can be exchanged via a single business-to-business Internet portal 102. To this end, the business-to-business Internet portal 102 may be operated in conjunction with an electronic banking mechanism 137 such as an electronic banking Internet website or other electronic banking system operated by a preferred or selected electronic banking institution. Upon receipt of a buyer's order, the business-to-business Internet portal 102 transmits at least two of buyer, order, electronic account number, price and terms of payment information to the electronic banking mechanism 137, and electronic banking mechanism 137 debits the appropriate buyer account and/or credits the appropriate vendor account. Alternatively, the account debiting and/or crediting may occur after the vendor conveys the order to a shipping carrier for delivery, after the order is received by the buyer, or after the buyer accepts the received order. Optionally, if the buyer accepts only a portion of the order, the business-to-business Internet portal 102 may transmit appropriate credit and/or debit information for the buyer and/or vendor accounts, based upon the portion of the order that was accepted or rejected.

Business-to-business Internet portal 102 includes a business-to-business portal database 130 coupled to a business-to-business portal computing system 134. Business-to-business portal computing system 134 is coupled to an Internet server 132 which, in turn, is coupled to the Internet 100. Business-to-business portal database 130 may be implemented using any computer-readable data storage medium, such as one or more floppy disk drives, hard disk drives, optical data storage devices, semiconductor memory devices, magnetic data storage devices, and/or various combinations thereof. Business-to-business database portal 130 is used to store one or more tables setting forth interrelationships among buyer identifiers, companies, and company locations, as well as optional buyer privilege levels. An example of such a table will be described hereinafter with reference to FIG. 4. Business-to-business portal database 130 is also used to store one or more tables specifying relationships among companies, departments, and authorized products for each of these departments. An example of such a table will be described hereinafter with reference to FIG. 5. Optionally, business-to-business database portal 130 provides a mechanism by which data pertaining to a plurality of buyer and/or vendor transactions is acquired and stored for subsequent aggregation, organization, analysis and/or examination. Access to the aggregated, organized and/or analyzed data may be provided only to individuals at an appropriate hierarchical level who are furnished with a "super-admin" password or the like.

Returning now to FIG. 1, business-to-business portal computing system 134 may be implemented using one or more personal computers, mainframe computers, laptop computers, networked computing devices, and/or various combinations thereof. Moreover, although FIG. 1 shows separate blocks for Internet server 132 and business-to-business portal computing system 134, these functionalities could be implemented by a single hardware block or element, or any combination of hardware blocks or elements, such as a plurality of personal computers that are networked together, at least one of which is configured as an Internet server. Finally, it is to be understood that the hardware configuration of FIG. 1 is shown for purposes of illustration, as those skilled in the art may envision other design approaches that are within the scope of the present invention.

Figure 2:
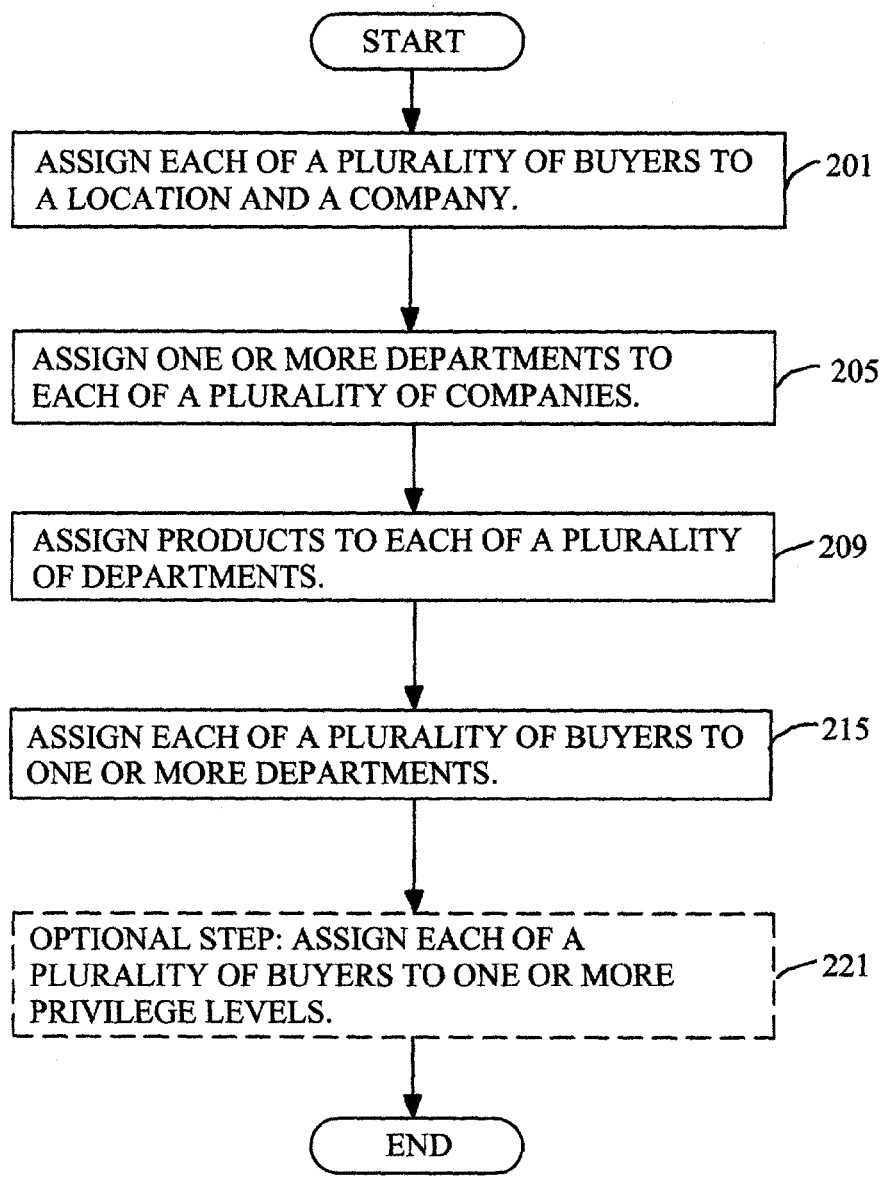
FIG. 2 is a flowchart setting forth an operational sequence for setting up buyer data.
Figure 3A:
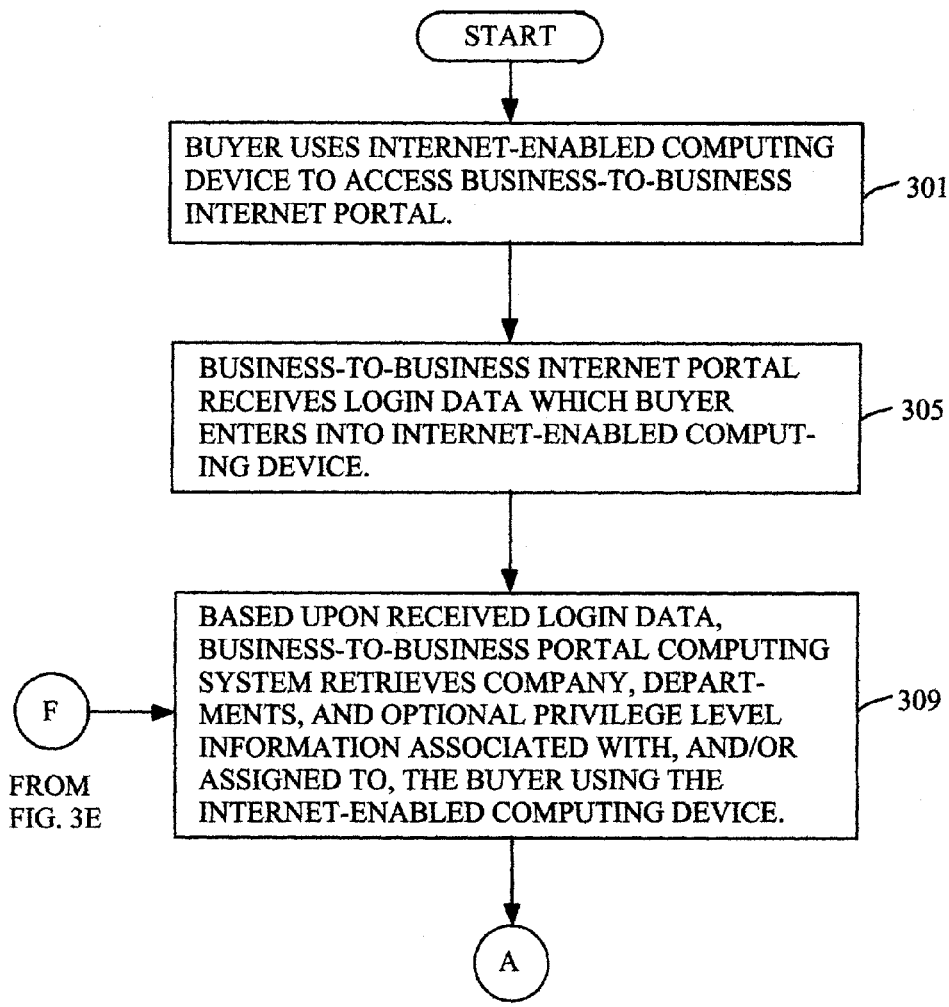
FIGS. 3A–3E together comprise a flowchart setting forth an operational sequence for facilitating transaction between buyers and vendors using a single business-to-business Internet portal.
Figure 3B:
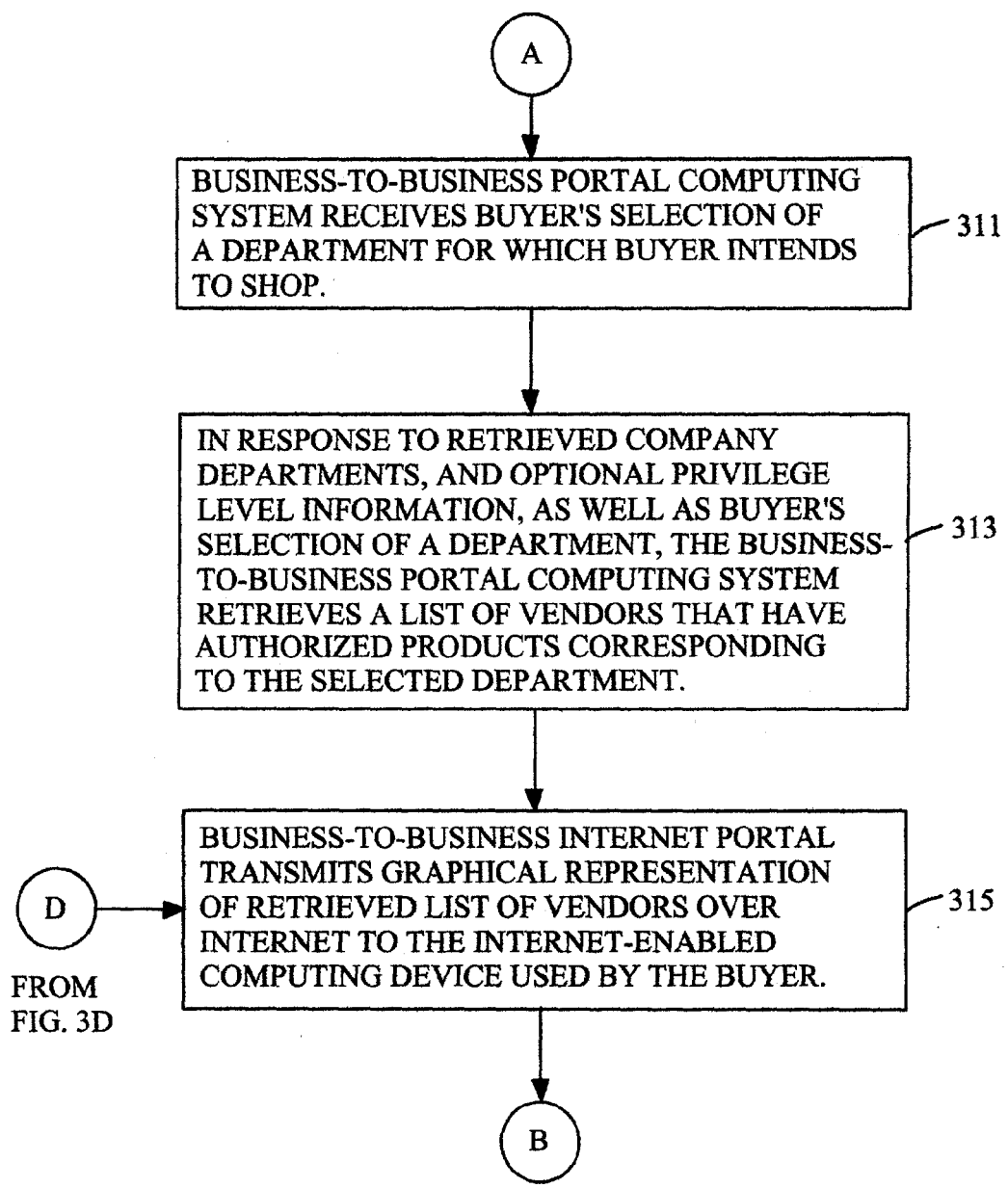
Figure 3C:
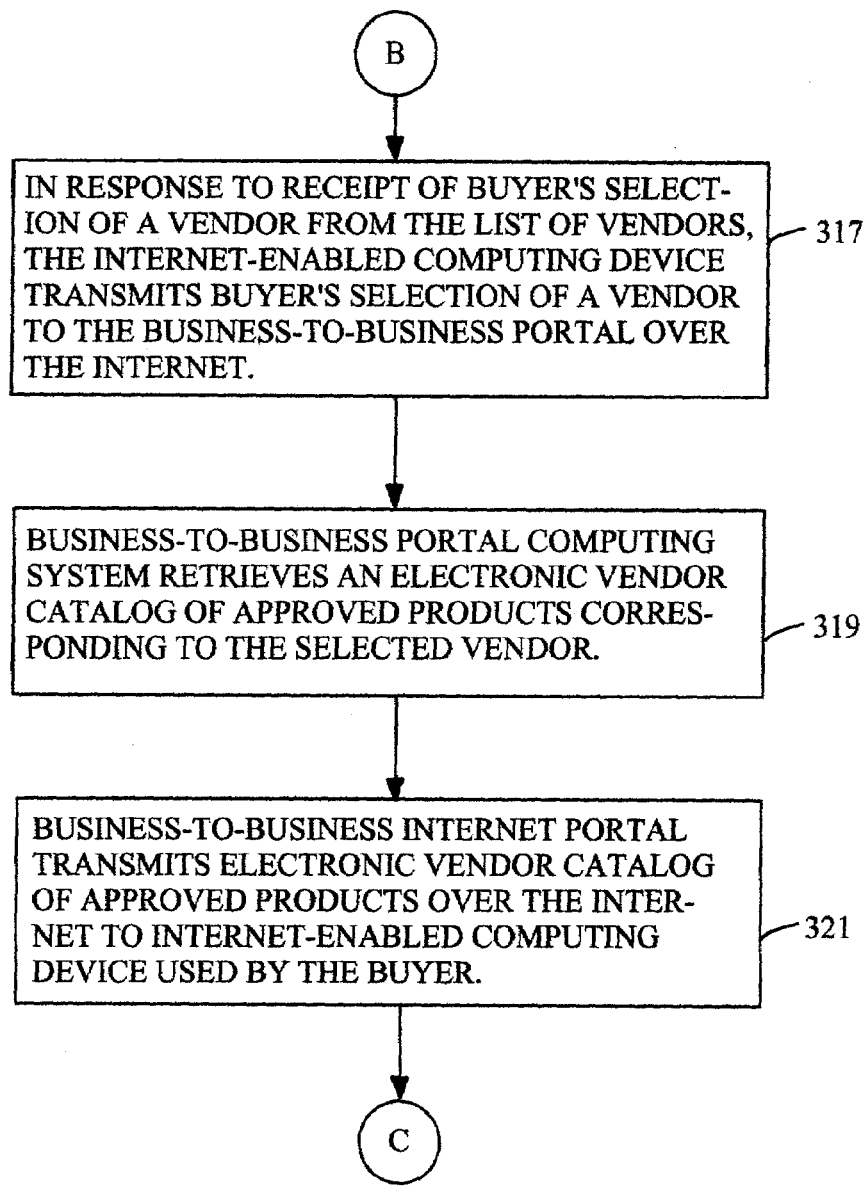
Figure 3D:
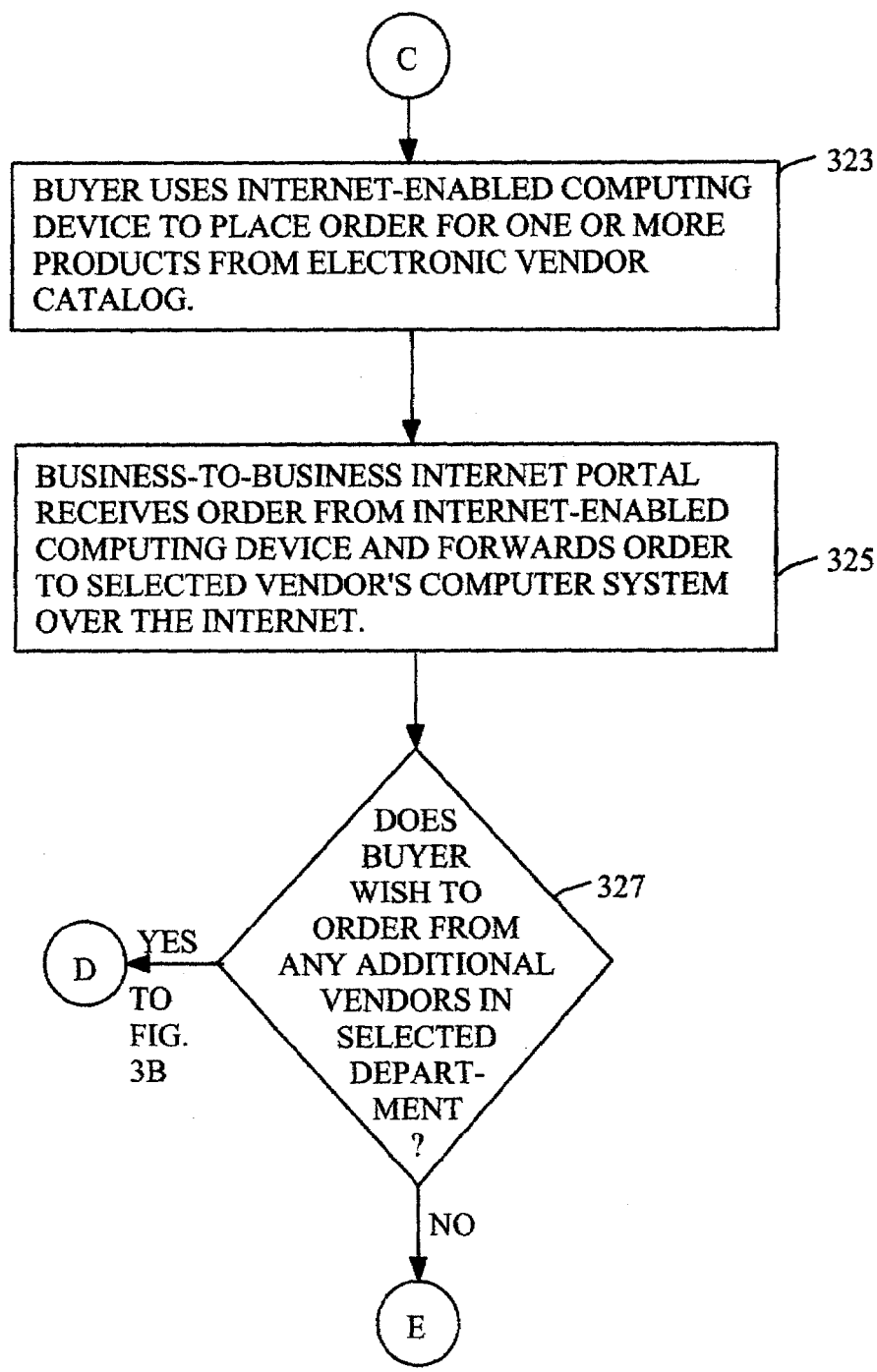
Figure 3E:
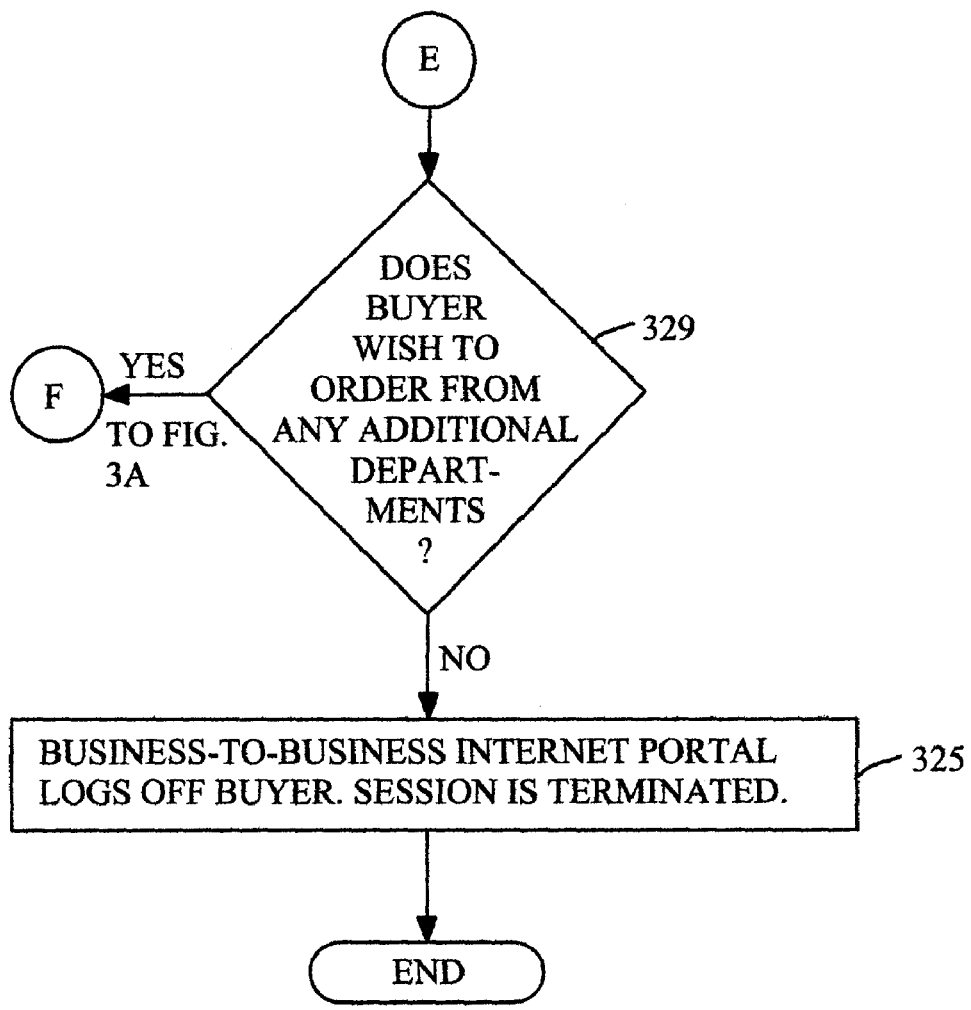
Figure 6:
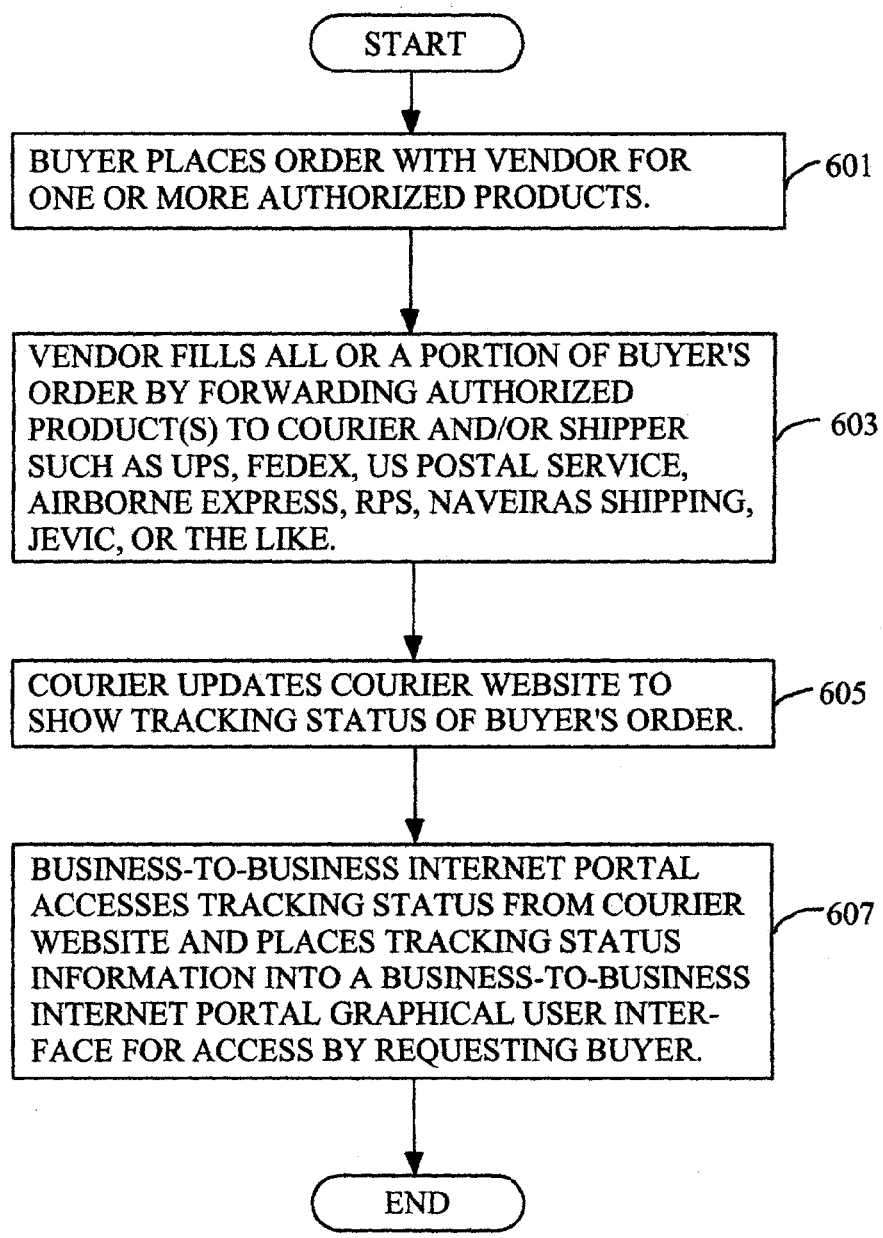
FIG. 6 is a flowchart setting forth an operational sequence for providing buyers with shipment tracking information using a single business-to-business Internet portal.

FIG. 2 is a flowchart setting forth an operational sequence for setting up buyer data. The operational sequence commences at block 201 where each of a plurality of buyers is assigned to a location and a company. For example, a first buyer could be assigned to the Hamilton Square location of Acme Foods. A second buyer could be assigned to the Hamilton Square, Yardville, and Bordentown locations of Acme Foods. These assignments are made, for example, by loading a Buyers Table (FIG. 5, to be described hereinafter) into business-to-business portal database 130. Next (block 205), one or more departments are assigned to each of a plurality of companies. Acme Foods is assigned, for instance, a Produce Department, a Dairy Department, a Meats Department, a Frozen Foods Department, and a Personal Care Products Department. For purposes of illustration, WalMart is assigned a Housewares Department, a Sporting Goods Department, an Electronics Department, and a Clothing Department. These assignments may be loaded into business-to-business portal database 130 in the form of a Companies Table (FIG. 6, to be described hereinafter). At block 209, one or more authorized products are assigned to each of a plurality of departments. The Acme Dairy Department could be assigned authorized products such as Dannons Vanilla Yogurt, Kraft American Cheese, Alpine Lace Swiss, and Fleischmann's Frozen Egg Beaters. Identifiers uniquely specifying these authorized products are also stored in the Companies Table (FIG. 6) and are associated with corresponding Departments of corresponding Companies. A first company might assign Fleischmann's Frozen Egg Beaters to the Frozen Foods Department, whereas a second company might assign Fleischmann's Frozen Egg Beaters to the Dairy Department. If a vendor such as Dannons offered Watermelon-flavored yogurt but Acme did not wish to carry such an item, it would not be listed in the table as an authorized product. For purposes of the present disclosure, authorized products are sometimes referred to as approved products, but these terms are intended to carry the same meaning when used herein.

At block 215, each of a plurality of buyers is assigned to one or more Departments. A first buyer could be assigned to the Dairy Department, whereas a second buyer is assigned to the Produce Department and the Meats Department. Optionally (block 221), each of a plurality of buyers is assigned to one or more privilege levels. A first privilege level, for example, would only permit the buyer to order authorized products for their Department without being shown the dollar cost for these products. A second privilege level would permit the buyer to view the dollar cost for these products, but the buyer would not be permitted to view the orders of other buyers in their company. A third privilege level would permit a buyer to view the orders of all buyers in a given Department of the company, a fourth privilege level would permit a buyer to view the orders of all buyers at a given location of the company, a fifth privilege level would permit a buyer to view the orders of all buyers at all locations of the company for a given Department, and a sixth privilege level would permit a buyer to view all orders for all Departments across the entire company. The privileges associated with these privilege levels are set forth for illustrative purposes, as other privileges could be associated with each of these levels, or greater or fewer levels provided, so as to meet the requirements of specific system applications. FIGS. 3A–3E together comprise a flowchart setting forth an operational sequence for facilitating transaction between buyers and vendors using a single business-to-business Internet portal (FIG. 1, 102). The operational sequence commences at block 301 where a buyer uses an Internet-enabled computing device (such as buyer company "A" first computing device 116 shown in FIG. 1) to access business-to-business Internet portal (FIG. 1, 102) over the Internet (FIG. 1, 100). The business-to-business Internet portal may be accessed, for example, by typing a URL (Universal Resource Locator) into an Internet browser program executed by the Internet-enabled computing device. This URL corresponds to the web address of the business-to-business Internet portal.

Next, at block 305, the business-to-business Internet portal receives login data which the buyer enters into the Internet-enabled computing device. This login data may specify, for example, a buyer identifier (FIG. 4, 403). At block 309, based upon the received login data, the business-to-business Internet portal retrieves Company, Departments, and optional privilege level data associated with this buyer identifier from the Buyers Table (FIG. 4). The business-to-business portal computing system then receives the buyer's selection of a Department for which the buyer intends to shop and possibly place orders for one or more authorized products (block 311).

In response to the retrieved company Departments and optional privilege level information, as well as the buyer's selection of a Department, the business-to-business portal computing system retrieves a list of vendors that have authorized product(s) corresponding to the selected Department (block 313). The business-to-business Internet portal transmits a graphical representation of a retrieved list of vendors over the Internet to the Internet-enabled computing device used by the buyer (block 315). Next, in response to a receipt of the buyer's selection of a vendor from the list of vendors, the Internet-enabled computing device transmits the buyer's selection of a vendor to the business-to-business portal over the Internet (block 317).

At block 319, the business-to-business portal computing system retrieves an electronic vendor catalog of approved products corresponding to the selected vendor. This catalog may be generated by the business-to-business portal computing system in response to information downloaded from one or more vendor computing systems (FIG. 1, 108, 114) over the Internet. The business-to-business portal computing system would then filter the downloaded information so as to provide an indication to buyers as to which products are approved (or not approved), and/or so as to provide only a list of approved products, and/or so as to include unapproved products only if the buyer has at least a certain privilege level.

The business-to-business Internet portal transmits the electronic vendor catalog including at least one or more approved products to the Internet-enabled computing device used by the buyer. This transmission takes place over the Internet (block 321). Next, the buyer uses the Internet-enabled computing device to place orders for one or more products from the electronic vendor catalog (block 323). The business-to-business Internet portal receives an order from the Internet-enabled computing device and forwards the order to the selected vendor's computing system over the Internet (block 325).

At block 327, a test is performed by the business-to-business Internet portal to ascertain whether or not the buyer wishes to order from any additional vendors in the selected Department. This test may be implemented in the form of a prompt message issued to the buyer, whereupon the buyer has the choice of selecting radio buttons labeled "yes" and "no" or the like. If the buyer does not wish to order from additional vendors, the program proceeds to block 329), described below. If the buyer wishes to order from additional vendors, the program loops back to block 315 (described above). At block 329, another test is performed by the business-to-business Internet portal to ascertain whether or not the buyer wishes to order from any additional Departments. If so, the program loops back to block 309. If not, the program progresses to block 331 where the business-to-business Internet portal logs off the buyer, and the buyer's shopping/ordering session is terminated.

FIG. 4 is a diagram setting forth an illustrative data structure for a Buyers Table 401 to be utilized in conjunction with the operational sequence of FIGS. 3A–3F. The Buyers Table associates each of a plurality of Buyer Identifiers 403 with corresponding Company Identifiers 405, Authorized Department Identifiers 407, Buyer Location Identifiers 409, and an optional Buyer Privilege Level Field 411. Buyers use buyer identifiers to log onto the business-to-business Internet portal, as was described hereinabove with reference to FIGS. 3A–3E, whereupon the business-to-business Internet portal is then able to retrieve a Company Identifier 405, Authorized Department Identifier(s) 407, Buyer Location Identifier(s) 409, and optional buyer privilege levels (stored in Buyer Privilege Level Field 411) associated with the specified Buyer Identifier 403.

Buyer Identifiers 403 may include any of multidigit numeric characters (19743), names (Joseph, Bob Prabumanius), alphabetic constructs (MMARKOV), abbreviations (NBQ), alphanumeric combinations (Sloan39, 232ABX, 437NAN), email addresses, computer-readable symbols, or the like, so as to identify a given buyer. Company Identifiers 405 may also be specified in the form of multidigit numeric characters (863, 57), names (Acme, Giant, Kings), abbreviations (T-Joes), alphanumeric combinations (SR376), email addresses, computer-readable symbols, or the like, so as to identify a given company. Authorized Department Identifiers 407 are specified in the form of numbers (10, 21, 47), names (Produce, Meats, Dairy), alphanumeric combinations (PRO2, DA17, M27, G01), variables that may specify a plurality of Departments (ALL would specify all Departments for a given Company), and abbreviations (FROZENFDS).

Buyer Location Identifiers 409 may be specified in numeric form (39, 520), as location names (Cherry Hill), city and state (Marlton, N.J.), alphanumeric characters (NJ03, perhaps indicating store number 3 in the state of New Jersey), variables specifying a plurality of locations (ALL signifying all locations, and SNJ signifying South Jersey locations). Optional buyer privilege levels in Buyer Privilege Level Field 411 may be specified in numeric form (4 for the fourth privilege level), a descriptive term (HIGH signifying high priority, or MASTER signifying very high priority), alphanumeric form (R4, perhaps corresponding to a personnel code such as Restocker—Level 4), or variables that actually specify what data the buyer should or should not have access to (PRICE=0 signifying that this buyer will not be able to view price information, and ADDL_DEPT=0 signifying that this buyer will not be able to view information pertaining to additional Departments for which they are not a buyer.

FIG. 5 is a diagram setting forth an illustrative data structure for a Companies Table 500 to be utilized in conjunction with the operational sequence of FIGS. 3A–3F. Companies Table 500 associates each of a plurality of Company Identifiers 501 with corresponding Departments Identifiers 503 and Product Identifiers 505. As previously discussed in connection with FIG. 4, company identifiers may take the form, for example, of names (ACME), abbreviations (T-Joes for Trader Joe's), numeric characters (11734), as well as other forms enumerated above. Department Identifiers 503, specifying each of a plurality of Departments corresponding to a given company, may take the form of names (DAIRY, PRODUCE), alphanumeric symbols (B101, CZ7, HCJB, FRO-12, CAN-01) or other forms as enumerated above in connection with FIG. 4. Each of a plurality of Department Identifiers 503 are associated with corresponding Product Identifiers 505 specifying authorized products for that Department. Product Identifiers may take the form of abbreviated descriptions (DANNON_VANILLA_YOGURT for Dannon's Vanilla Yogurt, SALTONSEA_PINK_GRAPEFRUIT for SaltonSea Brand Pink Grapefruits), alphanumeric characters (MV86, MC95, MN103), numbers (1190, 5975, 11495), and alphabetic identifiers (CHICKVLOO for a Chicken Vindaloo Frozen Dinner). Product Identifiers 505 need only be included for products that are authorized by a given buyer organization and/or store and/or company. Alternatively, authorized as well as unauthorized products could be listed in Product Identifiers 505 field, whereupon an Authorized Product field or variable may be associated with each of a plurality of Product Identifiers 505, indicating whether the specified product is authorized and/or unauthorized (for instance, AUTH=0 if the product is not authorized, AUTH=1 if the product is authorized).

FIG. 6 is a flowchart setting forth an operational sequence for providing buyers with shipment tracking information using a single business-to-business Internet portal. First, at block 601, the buyer places an order with a vendor for one or more authorized products using the business-to-business Internet portal. Next (block 603), the vendor fills all or a portion of the buyer's order by forwarding such authorized product(s) to a courier and/or shipper such as UPS, Federal Express, the US Postal Service, Airborne Express, RPS (Roadway Parcel Service), Naveiras Shipping, Jevic Shipping, or the like. The courier/shipper updates a courier website (FIG. 1, 136) to show the shipment tracking status of the buyer's order (block 605).

At block 607, the business-to-business Internet portal accesses the shipment tracking status from the courier website based upon a tracking request received from an Internet-enabled computing device used by a buyer. The courier webiste sends tracking status information for the shipment and/or order specified by the buyer's tracking request to the business-to-business Internet portal over the Internet. Then, the business-to-business portal computing system places the requested tracking status information into a graphical user interface for transmission back to the buyer's Internet-enabled computing device.

Figure 7A:
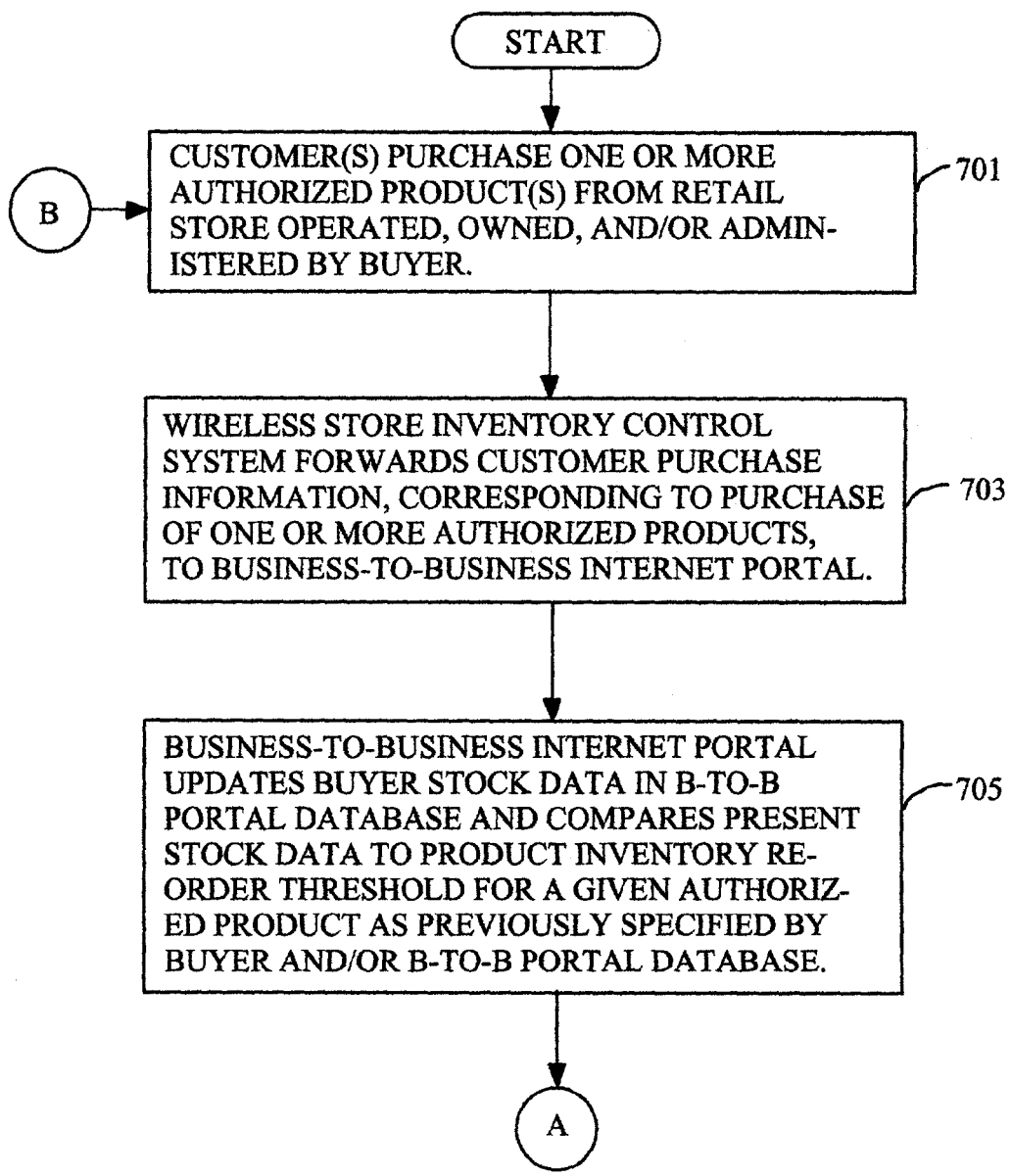
FIGS. 7A and 7B together comprise a flowchart setting forth an operational sequence for automatically placing buyer orders with a vendor in response to retail sales and/or depletion of stock.
Figure 7B:
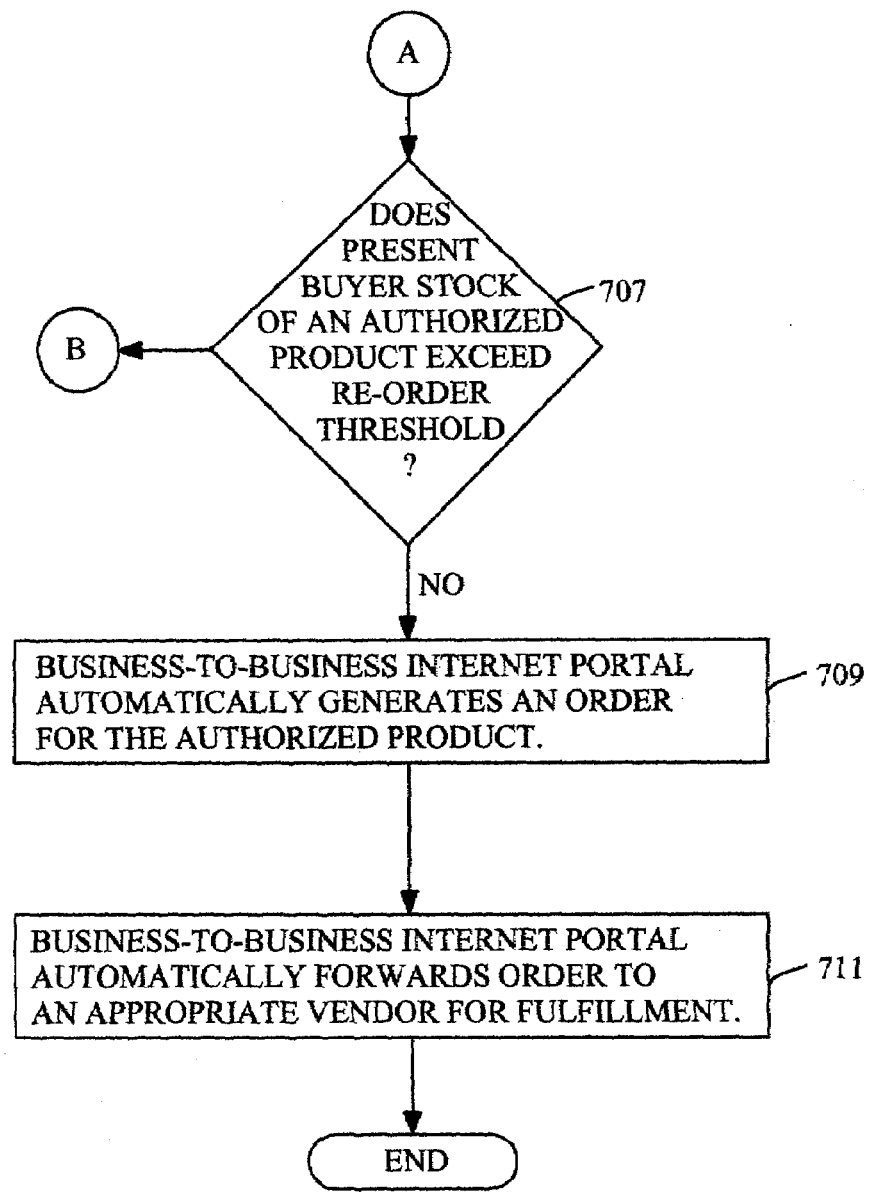

FIGS. 7A and 7B together comprise a flowchart setting forth an operational sequence for automatically placing buyer orders with a vendor in response to retail sales and/or depletion of stock. The operational sequence commences at block 701 where retail store customer(s) purchase one or more authorized products from a retail store operated, owned, and/or administered by a buyer. A wireless store inventory control system (FIG. 1, 138) forwards customer purchase information, corresponding to the purchase of one or more authorized products, to the business-to-business Internet portal (block 703). The business-to-business portal computing system updates buyer stock data stored in the business-to-business portal database (FIG. 1, 130), and compares the present stock data to a product inventory re-ordering threshold for a given authorized product. This threshold is previously specified by a buyer, and/or is stored in the business-to-business portal database, and/or a system default threshold may be employed (block 705).

At block 707, a test is performed to ascertain whether or not the present buyer stock of an authorized product exceeds the re-order threshold. If so, the program loops back to block 701. If not, the program progresses to block 709 where the business-to-business portal computing system automatically generates an electronic order for the authorized product. The business-to-business Internet portal then automatically forwards this electronic order to an appropriate vendor for fulfillment (block 711). An appropriate vendor may be selected from one of the vendors listed in the Buyers Table of FIG. 4 which is associated with the buyer in question. The buyer in question is a buyer for a store that is using the wireless store inventory control system. This buyer should be authorized to make purchases for the Department from which the depleted item is drawn. From among the available vendors listed on the Buyers Table of FIG. 4 for a given buyer, a vendor must be selected that offers the needed authorized product.

While the invention has been described with reference to specific implementations, we do not intend to limit the scope of the invention to these implementations. The systems and methods disclosed herein can be implemented using any of a wide variety of software and/or hardware platforms. In view of the many possible embodiments to which the principles of our invention may be applied, it should be recognized that the illustrated embodiments are only preferred examples of the invention and should not be taken as limitations as to the scope of the invention. Rather, the scope of the invention is defined by the following claims. We therefore claim as our invention all that falls within the spirit and scope of these claims.

I claim:

1. A method for use with an Internet-based, business-to-business web site, the method comprising the steps of:
   (a) aggregating product information from each of a plurality of vendors into a common display format;
   (b) in response to receiving identification information from an Internet-enabled computing device, the web site sending the computing device a graphical user interface showing a list of departments or product categories for which a buyer is authorized to make purchases;
   (c) upon receipt of a selection of a product category or department from the computing device, the web site sending the computing device a list of vendors that have authorized products corresponding to the selected department or category; and
   (d) upon receipt of a selection of a vendor, the web site sending the computing device that vendor's list of approved products corresponding to the selected department or category.

2. The method of claim 1 further including the steps of:
   (e) the computing device receiving an order for one or more approved products; and
   (f) the web site receiving the order from the computing device;
   wherein the order specifies a plurality of order parameters including the identity of the product and the quantity desired.

3. The method of claim 2 further including the step of the web site forwarding the order to the selected vendor for fulfillment.

4. The method of claim 3 further including the step of the web site receiving order tracking information pertaining to a tracking of shipment of the order from the vendor to the buyer.

5. The method of claim 3 further including the steps of providing each of a plurality of buyers with one or more Internet-enabled computing devices, and associating each of a plurality of buyers with a corresponding privilege level.

6. The method of claim 5 further including the step of the web site providing a first privilege level which allows the buyer to view the identities and descriptions of approved vendor products.

7. The method of claim 6 further including the step of the web site providing a second privilege level which allows the buyer to view identities and descriptions as well as price information.

8. The method of claim 7 further including the step of the web site providing a third privilege level which allows the buyer to view the orders and purchases of other buyers in the same product category or department.

9. The method of claim 8 further including the step of the web site providing a fourth privilege level which allows the buyer to view all orders and purchases made by all buyers at a given location or facility.

10. The method of claim 9 further including the step of the web site providing a fifth privilege level which allows the buyer to view all purchases made by all buyers at all facilities of a given buyer company.

11. The method of claim 5 further including the step of the web site providing a super-administrative privilege level which allows an administrator to implement at least one of acquisition, aggregation, analysis, and examination of data pertaining to a plurality of buyer or vendor transactions.

12. The method of claim 5 further including the step of the web site assigning every buyer order a unique order number that includes information identifying the year, month, day, and hour that the order was placed.

13. The method of claim 12 further including the steps of assigning a first incoming buyer order received during a particular year, month, day, and hour, a first sequence number, and the second incoming buyer order received during this particular year, month, day and hour, a second sequence number, wherein the first and second incoming buyer orders could, but need not, be from the same buyer.

14. The method of claim 12 further including the web site associating each order with a status byte indicative of whether the order is pending, cancelled, shipped full, shipped partial, back ordered, received full, received partial, refused full, or refused partial.

15. The method of claim 14 further including the step of the web site updating the order status byte in response to information received from at least one of vendors, buyers, couriers, and shippers.

16. The method of claim 15 further including the step of electronically debiting a buyer's bank account in response to at least one of the buyer placing an order and the buyer receiving an order.

17. The method of claim 15 further including the step of electronically crediting a vendor's bank account in response to at least one of the buyer placing an order from the vendor and the vendor shipping the order to the buyer.

18. The method of claim 15 further including the step of electronically crediting a vendor's bank account in an amount corresponding to at least one of the vendor shipping a partial order, the buyer receiving a partial order and the buyer refusing a portion of a shipped order.

19. The method of claim 15 further including the step of electronically debiting a buyer's bank account in an amount corresponding to at least one of the vendor shipping a partial order, the buyer receiving a partial order and the buyer refusing a portion of a shipped order.

20. The method of claim 1 further including the steps of providing ordering and shipment tracking capabilities from a single integrated business-to-business website.

21. The method of claim 20 further including the step of programming the business-to-business website to automatically download information from a second website operated by or on behalf of a courier or shipping company.

22. The method of claim 21 further including the step of the business-to-business website accessing the second website, periodically or in response to a request, to retrieve information about a specified buyer order.

23. The method of claim 1 further including the step of the website automatically placing an order for a buyer in response to the buyer's inventory dropping below a predetermined threshold.

24. The method of claim 23 further including the step of, for each of a plurality of authorized vendor products, using an electronic inventory control system at the buyer's store or chain of stores to keep track of retail customer sales.

25. The method of claim 24 further including the step of the business-to-business website, on a repeated or periodic basis, comparing retail consumer sales against inventory to determine stock on hand.

26. The method of claim 25 further including the step of, in response to inventory or stock on hand dropping below a predetermined threshold, establishing a communications link between the electronic inventory control system and the business-to-business website, such that a product identifier and buyer identifier are received at the website.

27. The method of claim 26 further including the step of, in response to the receipt of a product identifier and a buyer identifier, the website automatically placing an electronic order for the authorized product from a vendor.

28. A method of doing business for use with an Internet-based, business-to-business web site, the method comprising the steps of:
   (a) aggregating product information from each of a plurality of vendors into a common display format;
   (b) in response to receiving identification information from a buyer, the web site sending the buyer a graphical user interface showing a list of departments or product categories for which the buyer is authorized to make purchases;
   (c) upon receipt of a selection of a product category or department from the buyer, the web site sending the buyer a list of vendors that have authorized products corresponding to the selected department or category; and
   (d) upon receipt of a selection of a vendor, the web site sending the buyer that vendor's list of approved products corresponding to the selected department or category.

29. The method of claim 28 further including the step of the web site receiving the order from the buyer, wherein the order specifies a plurality of order parameters including the identity of the product and the quantity desired.

30. The method of claim 29 further including the step of the web site forwarding the order to the selected vendor for fulfillment.

31. The method of claim 30 further including the step of the web site receiving order tracking information pertaining to a tracking of shipment of the order from the vendor to the buyer.

32. The method of claim 29 further including the step of associating each of a plurality of buyers with a corresponding privilege level.

33. The method of claim 32 further including the step of the web site providing a super-administrative privilege level which allows an administrator to implement at least one of acquisition, aggregation, analysis, and examination of data pertaining to a plurality of buyer or vendor transactions.

34. The method of claim 32 further including the step of the web site providing a first privilege level which allows the buyer to view the identities and descriptions of approved vendor products.

35. The method of claim 34 further including the step of the web site providing a second privilege level which allows the buyer to view identities and descriptions as well as price information.

36. The method of claim 35 further including the step of the web site providing a third privilege level which allows the buyer to view the orders and purchases of other buyers in the same product category or department.

37. The method of claim 36 further including the step of the web site providing a fourth privilege level which allows the buyer to view all orders and purchases made by all buyers at a given location or facility.

38. The method of claim 37 further including the step of the web site providing a fifth privilege level which allows the buyer to view all purchases made by all buyers at all facilities of a given buyer company.

39. The method of claim 31 further including the step of the web site assigning every buyer order a unique order number that includes information identifying the year, month, day, and hour that the order was placed.

40. The method of claim 39 further including the steps of assigning a first incoming order received during a particular year, month, day, and hour, a first sequence number, and the second incoming order received during this particular year, month, day and hour, a second sequence number.

41. The method of claim 40 further including the web site associating each order with a status byte indicative of whether the order is pending, cancelled, shipped full, shipped partial, back ordered, received full, received partial, refused full, or refused partial.

42. The method of claim 41 further including the step of the web site updating the order status byte in response to information received from at least one of vendors, buyers, couriers, and shippers.

43. The method of claim 42 further including the step of electronically debiting a buyer's bank account in response to at least one of the buyer placing an order and the buyer receiving an order.

44. The method of claim 42 further including the step of electronically crediting a vendor's bank account in response to at least one of the buyer placing an order from the vendor and the vendor shipping the order to the buyer.

45. The method of claim 42 further including the step of electronically crediting a vendor's bank account in an amount corresponding to at least one of the vendor shipping a partial order, the buyer receiving a partial order and the buyer refusing a portion of a shipped order.

46. The method of claim 42 further including the step of electronically debiting a buyer's bank account in an amount corresponding to at least one of the vendor shipping a partial order, the buyer receiving a partial order and the buyer refusing a portion of a shipped order.

47. The method of claim 28 further including the steps of providing ordering and shipment tracking capabilities from a single integrated business-to-business website.

48. The method of claim 47 further including the step of programming the business-to-business website to automatically download information from a second website operated by or on behalf of a courier or shipping company.

49. The method of claim 48 further including the step of the business-to-business website accessing the second website, periodically or in response to a request, to retrieve information about a specified buyer order.

50. The method of claim 28 further including the step of the website automatically placing an order for a buyer in response to the buyer's inventory dropping below a predetermined threshold.

51. The method of claim 50 further including the step of, for each of a plurality of authorized vendor products, using an electronic inventory control system at the buyer's store or chain of stores to keep track of retail customer sales.

52. The method of claim 51 further including the step of the business-to-business website, on a repeated or periodic basis, comparing retail consumer sales against inventory to determine stock on hand.

53. The method of claim 52 further including the step of, in response to inventory or stock on hand dropping below a predetermined threshold, establishing a communications link between the electronic inventory control system and the business-to-business website, such that a product identifier and buyer identifier are received at the website.

54. The method of claim 53 further including the step of, in response to the receipt of a product identifier and a buyer identifier, the website automatically placing an electronic order for the authorized product from a vendor.

55. A method of doing business for use with an Internet-based, business-to-business web site, the method comprising the steps of:

(a) aggregating product information from each of a plurality of vendors into a common display format;

(b) in response to receiving identification information from a buyer, the web site sending the buyer a graphical user interface showing a list of departments or product categories for which the buyer is authorized to make purchases;

(c) upon receipt of a selection of a product category or department from the buyer, the web site sending the buyer a list of vendors that have authorized products corresponding to the selected department or category;

(d) upon receipt of a selection of a first vendor, the web site sending the buyer the first vendor's list of approved products corresponding to the selected department or category; and (e) receiving on-line at the web site an order from the buyer for at least one of the approved products without logging on to a web site of the first vendor.

56. The method of claim 55 further including the step of permitting the buyer to shop for the approved products offered by the first vendor, followed by shopping for the approved products offered by a second vendor.

* * * * *